（12）United States Patent
Christensen

(10) Patent No.: US 10,858,224 B2
(45) Date of Patent: Dec. 8, 2020

(54) LOADER WITH BOOM SWING CONTROL SYSTEM

(71) Applicant: Logging Equipment Mfg. Co., Inc., Hill City, MN (US)

(72) Inventor: Bruce E. Christensen, Grand Rapids, MN (US)

(73) Assignee: LOGGING EQUIPMENT MFG. CO., INC., Hill City, MN (US)

( * ) Notice: Subject to any disclaimer, the term of this patent is extended or adjusted under 35 U.S.C. 154(b) by 32 days.

(21) Appl. No.: 16/262,394

(22) Filed: Jan. 30, 2019

(65) Prior Publication Data

US 2020/0238885 A1 Jul. 30, 2020

(51) Int. Cl.
*B66C 23/94* (2006.01)
*B66C 23/86* (2006.01)

(52) U.S. Cl.
CPC .............. *B66C 23/94* (2013.01); *B66C 23/86* (2013.01)

(58) Field of Classification Search
CPC ................................ B66C 23/86; B66C 23/94
See application file for complete search history.

(56) References Cited

U.S. PATENT DOCUMENTS

| | | |
|---|---|---|
| 2,794,557 A | 6/1957 | Vero |
| 2,796,998 A | 6/1957 | Sundin |
| 3,003,649 A | 10/1961 | Przybylaki |
| 3,082,889 A | 3/1963 | Bopp |
| 3,190,475 A | 6/1965 | Fischer |
| 3,216,589 A | 11/1965 | Walker |
| 3,738,500 A | 6/1973 | Coleman et al. |
| RE30,611 E | 5/1981 | Wappler |
| 4,768,662 A | 9/1988 | Poudrier et al. |
| 5,323,690 A | 6/1994 | Sims |
| 5,361,211 A | 11/1994 | Lee et al. |
| 5,678,707 A * | 10/1997 | Stallbaumer ............ B66C 23/86 212/253 |
| 7,975,410 B2 | 7/2011 | Faivre et al. |
| 2015/0284934 A1 | 10/2015 | Suk |
| 2017/0342683 A1 | 1/2017 | Kim |

OTHER PUBLICATIONS

Christensen, Unpublished U.S. Appl. No. 16/211,638 entitled "Loader With Operator Elevator System," filed Dec. 6, 2018, 39 pages.

* cited by examiner

*Primary Examiner* — F Daniel Lopez
(74) *Attorney, Agent, or Firm* — Fredrikson & Byron, P.A.

(57) ABSTRACT

The invention provides a loader having a boom, a hydraulic motor, a slewing ring, and a boom swing control assembly. The boom is configured to rotate in response to operation of the hydraulic motor. The boom swing control assembly comprises a control gear, a first valve, and a first hydraulic line. The control gear is engaged with a slew gear of the slewing ring such that the control gear rotates in response to rotation of the boom. The hydraulic line is in fluid communication with the first valve and the hydraulic motor. Depending on whether the first valve is in an open or a closed configuration, hydraulic fluid is either free to pass, or is restrained from passing, through the first hydraulic line to the hydraulic motor.

34 Claims, 10 Drawing Sheets

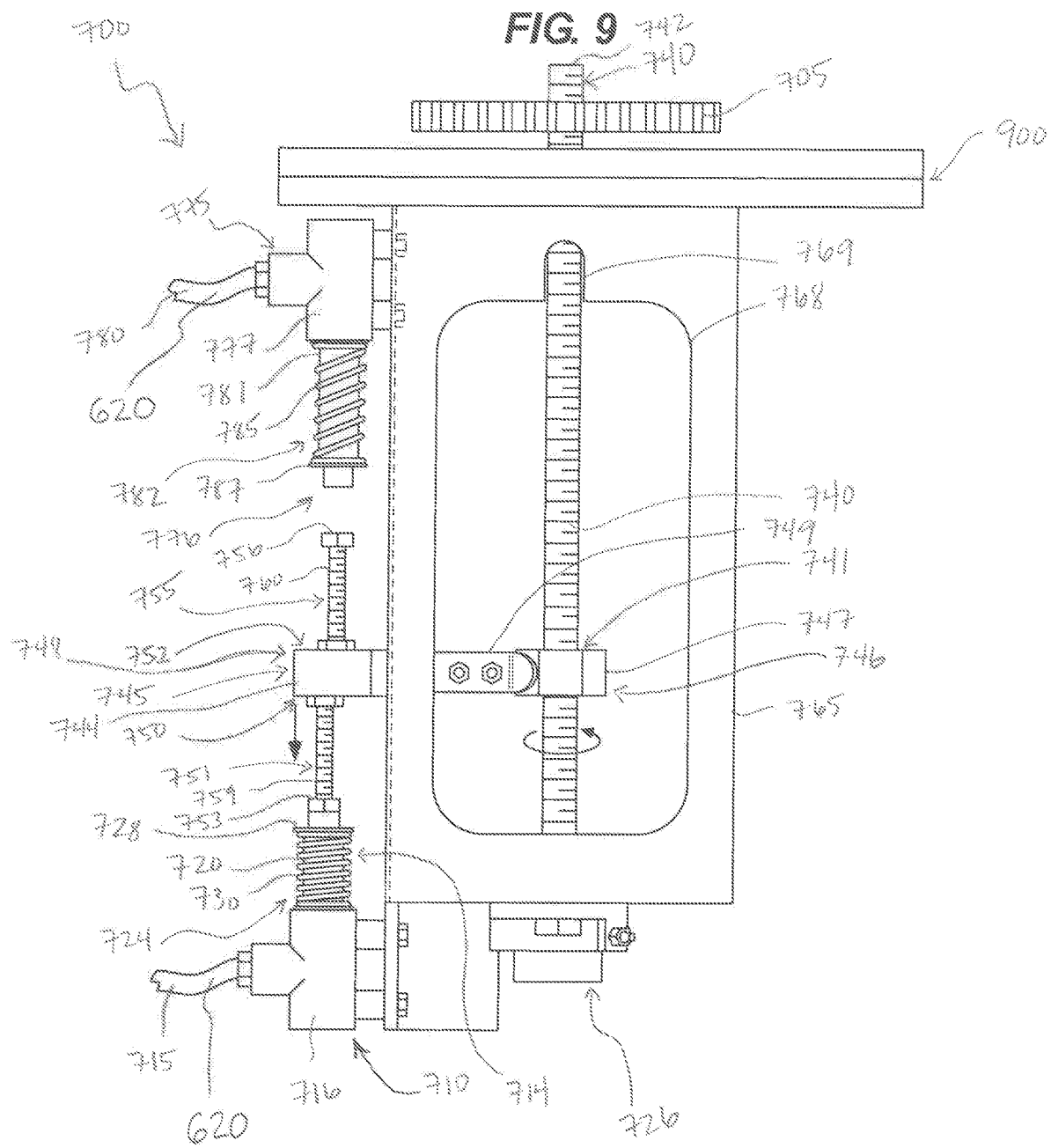

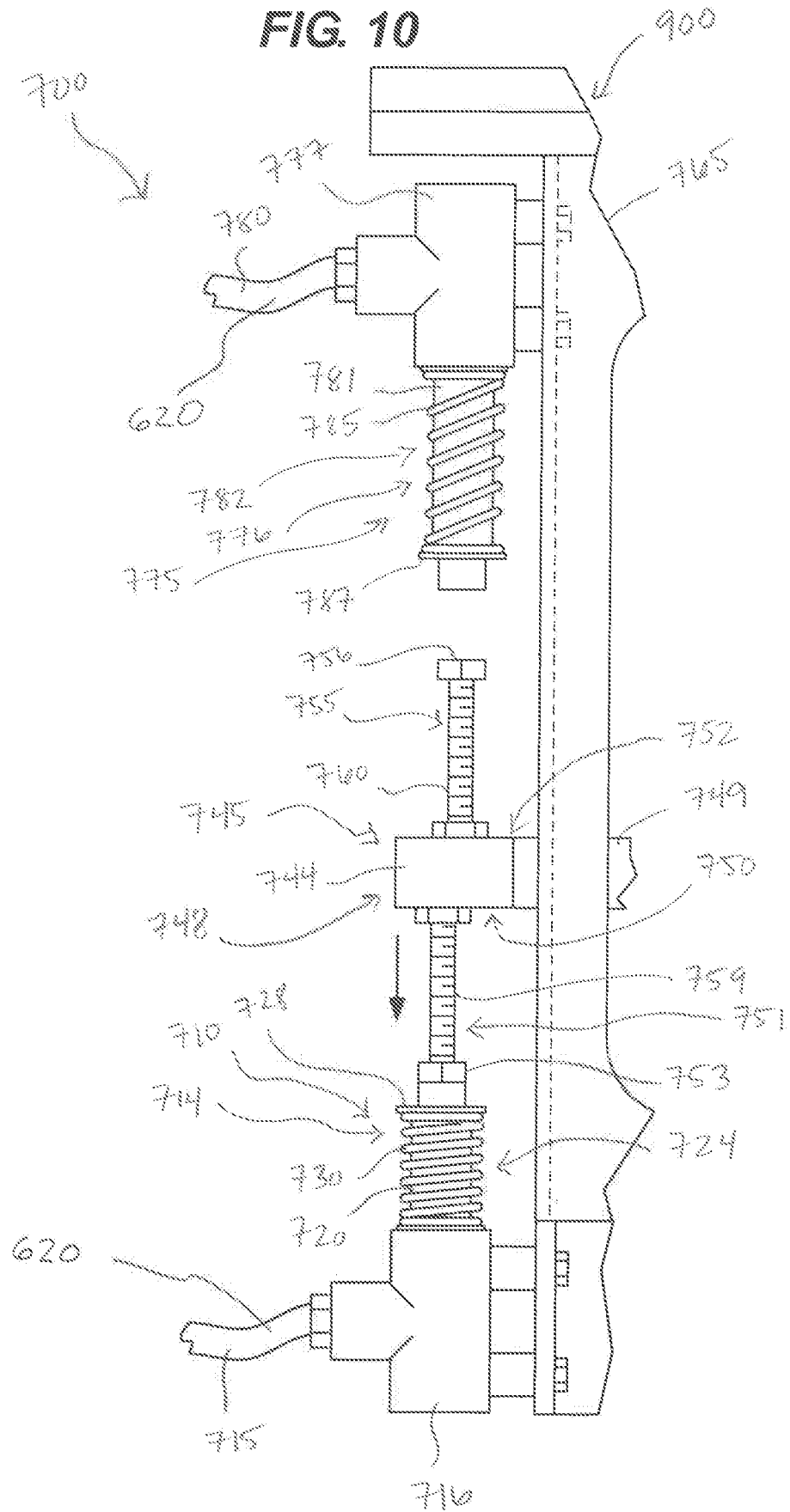

LOADER WITH BOOM SWING CONTROL SYSTEM

FIELD OF THE INVENTION

The present invention relates generally to a loader for moving logs, railroad ties, scrap, or other items. The present invention also provides methods for operating such a loader.

BACKGROUND OF THE INVENTION

Various loaders are known. Loaders can be mounted on a truck or trailer, for example, to assist with moving items, such as logs, railroad ties, scrap or the like. The boom of such a loader is able to swing (e.g., swivel or turn on a bearing), so as to permit side-to-side movement of the boom. One limitation of certain existing loaders is they have no system for limiting boom swing.

As set forth in the present disclosure, it would be desirable to provide a loader having a boom swing control assembly that limits how far the boom can swing in at least a first direction. In some cases, it would be desirable to provide such a boom swing control assembly that also limits how far the boom can swing in a second direction, which is opposite the first direction. It would also be desirable to provide a boom swing control assembly that allows the swing limit(s) to be adjusted. Further, it would be desirable to provide a system configured to control boom swing so it stops gradually, slowly, and/or at a controlled rate.

SUMMARY OF THE INVENTION

In some embodiments, the invention provides a loader having an upper assembly, a base assembly, a slewing ring, a hydraulic motor, and a boom swing control assembly. The upper assembly comprises a boom and is mounted on the base assembly so as to rotate relative to the base assembly in response to operation of the hydraulic motor. The slewing ring comprises a slew gear, and the boom swing control assembly comprises a control gear. The control gear is engaged with the slew gear such that the control gear rotates in response to rotation of the upper assembly. The boom swing control assembly further comprises a first valve and a first hydraulic line. The first hydraulic line is in fluid communication with both the first valve and the hydraulic motor. The first valve has an open configuration and a closed configuration, such that when the first valve is in the open configuration hydraulic fluid is free to pass through the first hydraulic line to the hydraulic motor, and when the first valve is in the closed configuration hydraulic fluid is restrained from passing through the first hydraulic line to the hydraulic motor. The first valve is configured to move from the open configuration to the closed configuration in response to a desired amount of rotation of the control gear in a first direction.

Certain other embodiments of the invention provide a loader having a boom, an operator platform, a slewing ring, a gear box, a hydraulic motor, and a boom swing control assembly. The hydraulic motor is operably coupled with the gear box. The gear box comprises a drive gear, and the slewing ring comprises a slew gear. The drive gear of the gear box is engaged with the slew gear of the slewing ring such that the boom rotates in response to rotation of the drive gear. The boom swing control assembly comprises a control gear engaged with the slew gear such that the control gear rotates in response to rotation of the boom. The boom swing control assembly further comprises a first valve and a first hydraulic line. The first hydraulic line is in fluid communication with both the first valve and the hydraulic motor. The first valve has an open configuration and a closed configuration, such that when the first valve is in the open configuration hydraulic fluid is free to pass through the first hydraulic line to the hydraulic motor, whereas when the first valve is in the closed configuration hydraulic fluid is restrained from passing through the first hydraulic line to the hydraulic motor. The first valve is configured to move from the open configuration to the closed configuration in response to a desired amount of rotation of the control gear in a first direction.

The boom swing control assembly of the present loader is configured to control a swing of the boom so as to limit how far the boom is able to swing in one or more directions.

In some embodiments, the boom swing control assembly includes both a first valve and a second valve configured to limit how far the boom is able to swing in both (i.e., opposite) directions.

In certain embodiments, the swing limits set by a first valve and/or a second valve are adjustable.

Preferably, movement of an upper assembly (and thus movement of a boom of the upper assembly) in a primary direction gradually slows and comes to a stop in response to the first valve moving from an open configuration to a closed configuration. Similarly, in embodiments where a second valve is provided, movement of the upper assembly (and thus movement of a boom of the upper assembly) in a secondary direction gradually slows and comes to a stop in response to the second valve moving from an open configuration to a closed configuration.

BRIEF DESCRIPTION OF THE DRAWINGS

FIG. 9 is a front view of the boom swing control assembly of FIG. 7.

FIG. 10 is a detailed front view of a portion of the boom swing control assembly of FIG. 9, showing a first valve in a closed configuration and a second valve in an open configuration.

DETAILED DESCRIPTION OF PREFERRED EMBODIMENTS

Figure 1:
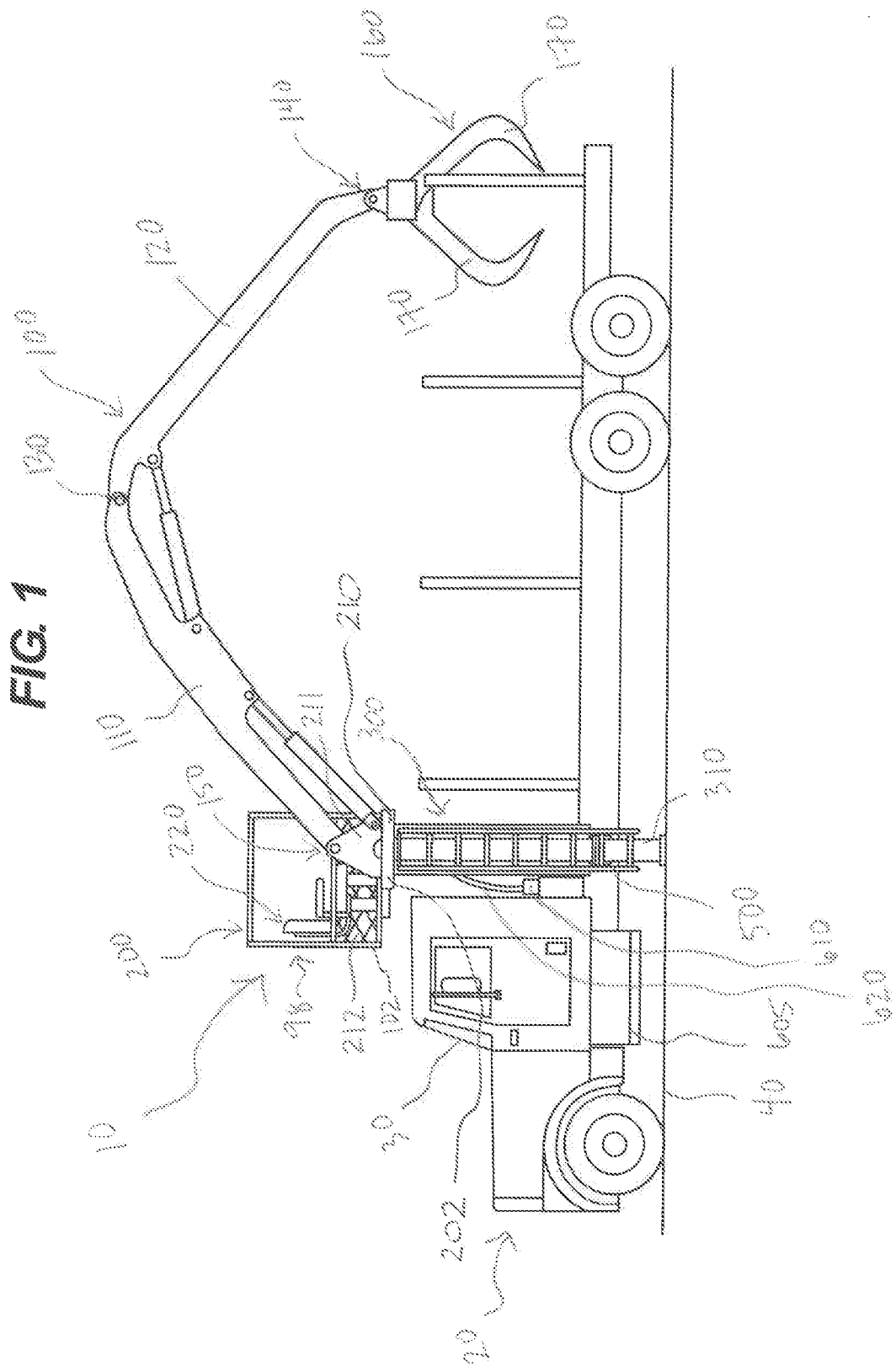
FIG. 1 is a side view of a loader in accordance with certain embodiments of the present disclosure, showing the loader mounted to a truck.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 2:
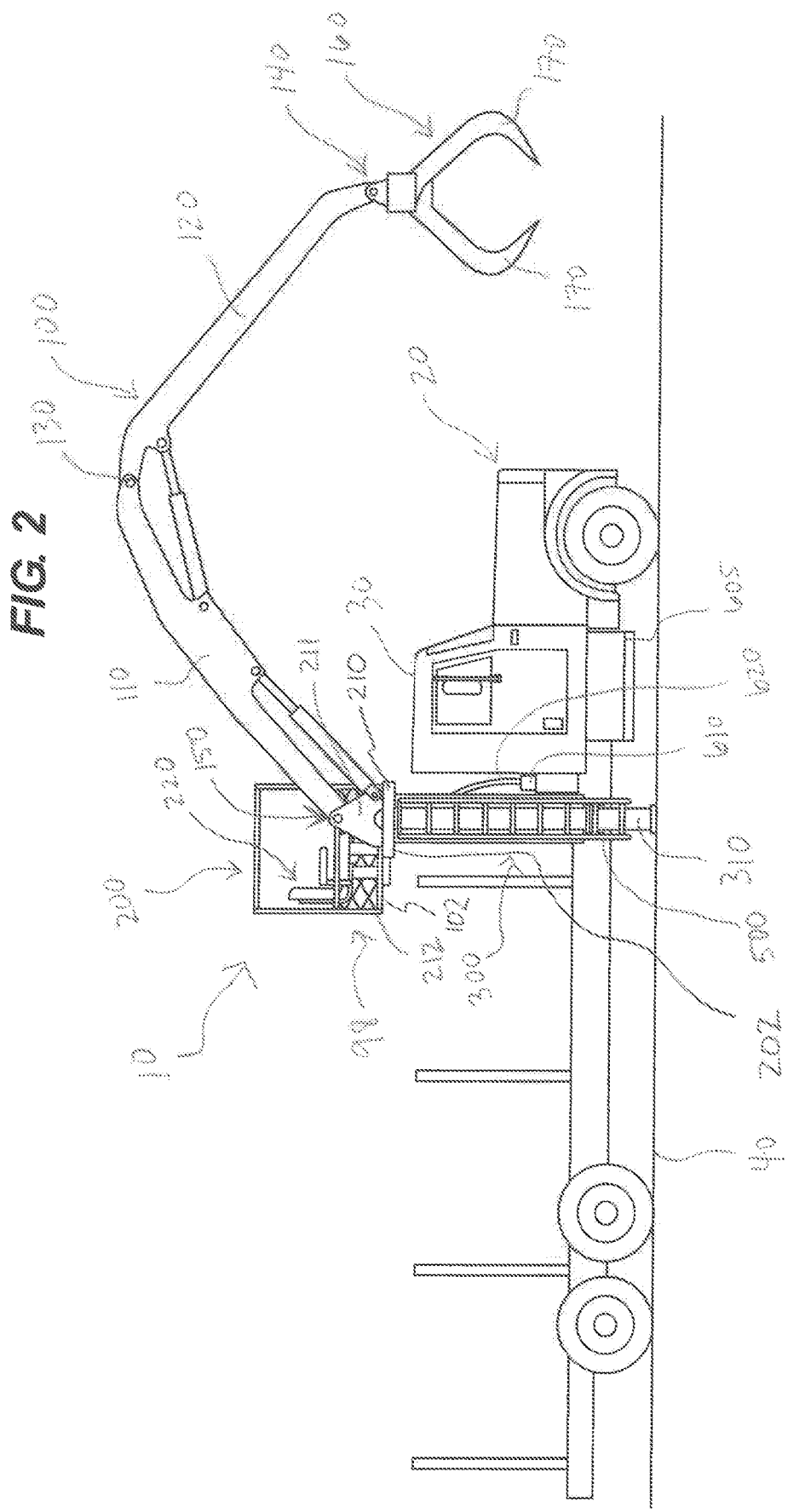
FIG. 2 is another side view of the loader of FIG. 1, showing the loader mounted to the truck.
Figure 3:
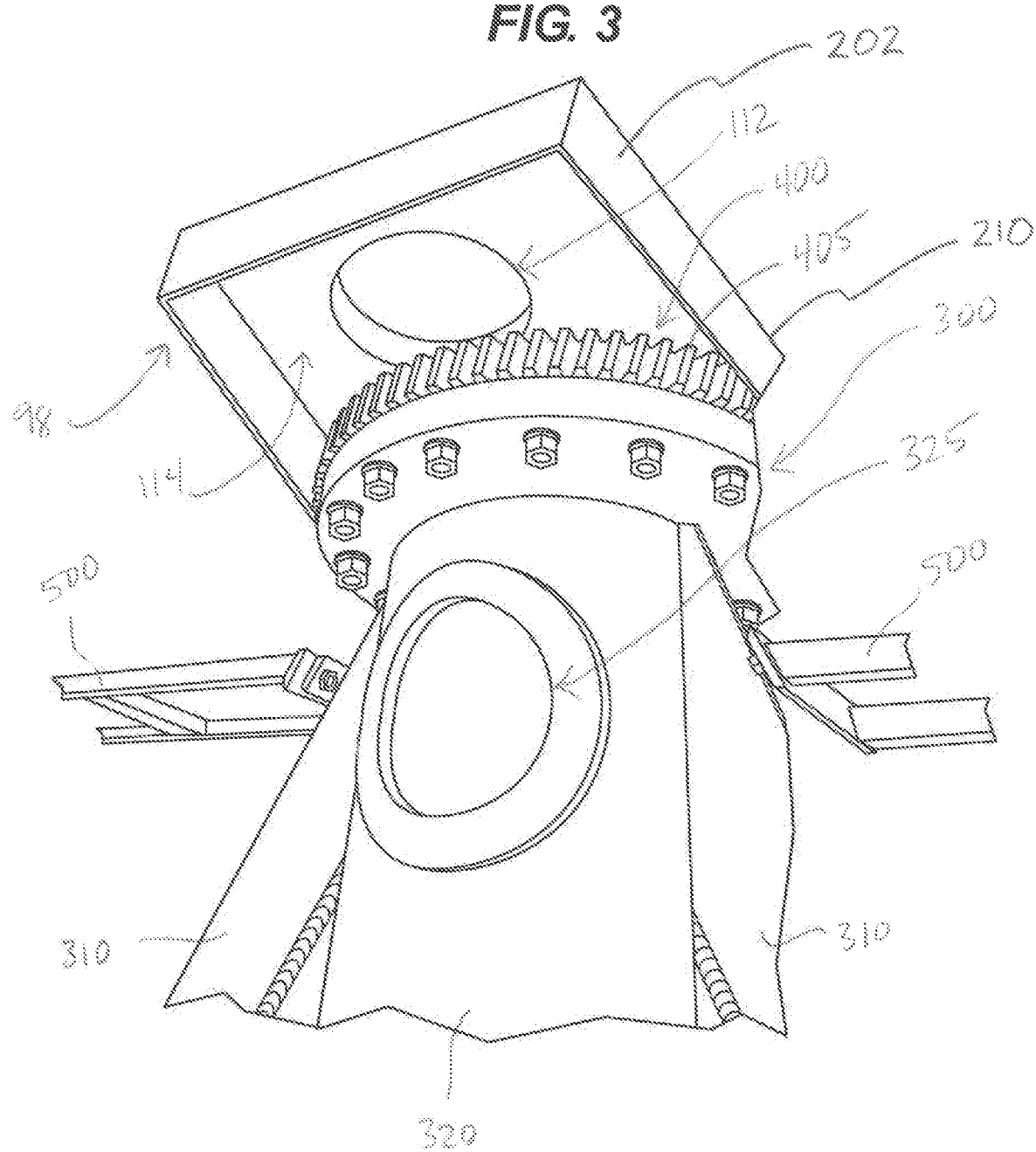
FIG. 3 is a partially broken-away rear perspective view of a loader in accordance with certain embodiments of the present disclosure, showing part of both an upper assembly and a base assembly of the loader, with a gear box and a hydraulic motor omitted from the drawing for illustration purposes.

Referring to the drawings, and in particular, FIG. 1, there is shown a loader (or "material handler") of the present disclosure generally represented by reference numeral 10. The loader 10 is configured to move items, such as logs, railroad ties, scrap or other materials. As shown in FIGS. 1 and 2, the loader 10 can be mounted on a truck 20, such as behind (and in some cases, adjacent) a cab 30 of the truck 20. Alternatively, the loader 10 can be mounted on a trailer. More generally, the loader 10 can be mounted on various different platforms, bases, or carriages (e.g., a carriage configured to ride on the rails of a railroad track). In some embodiments, the loader 10 is a stationary loader, i.e., one mounted to a stationary base. In embodiments of this nature, the stationary base can be a floor surface or a ground surface or a platform surface, or a foundation block (e.g., a cement block) mounted to a floor surface or a ground surface or a platform surface.

The illustrated loader 10 has an upper assembly 98 and a base assembly 300. The illustrated upper assembly 98 comprises a boom 100 and is mounted on the base assembly 300 so as to rotate relative to the base assembly 300. The base assembly 300, which may be a pedestal base assembly, provides support to the upper assembly 98. Preferably, the base assembly 300 is configured to remain stationary when the upper assembly 98 (including the boom) rotates. Thus, the upper assembly 98 preferably is configured to rotate relative to the base assembly 300.

The loader 10 has a hydraulic system that includes a hydraulic motor 105. The boom 100 rotates relative to the base assembly 300 in response to operation of the hydraulic motor 105.

The illustrated boom 100 comprises a pair of jointed arms (or "boom sections") 110, 120. Thus, the illustrated boom is a knuckle boom, and the illustrated loader is a knuckle boom loader. The boom 100, however, need not be knuckled, and thus the present loader 10 need not be a knuckle boom loader.

In the embodiment illustrated, the arms 110, 120 of the knuckle boom 100 are connected to each other at a pivot point 130 that allows the boom 100 to pivot at the pivot point 130. As shown in FIGS. 1 and 2, the pivot point 130 can optionally be approximately equidistant between a first end 140 and a second end 150 of the boom 100. However, skilled artisans will appreciate that the pivot point 130 can be located closer to the first end 140 or to the second end 150 of the boom 100 than is shown in the figures. Moreover, the boom need not have a pivot point at all. More generally, various different types of booms can be used for the present loader; the particular type of boom 100 is not limiting to the invention.

As noted above, the loader 10 has a hydraulic motor 105 such that the boom 100 is hydraulically actuated. Typically, the loader 10 is equipped with at least one hydraulic cylinder. In the embodiment illustrated, the boom 100 has a plurality of hydraulic cylinders. For example, the boom 100 may have a main boom cylinder and a stick boom cylinder. In some cases, it may also have a grapple cylinder. A variety of conventional boom cylinders are commercially available from different suppliers, such as Lemco Hydraulics of Hill City, Minn., USA. Thus, the loader 10 preferably has one or more (e.g., a plurality of) hydraulic lines on the boom 100.

The boom 100 is shown with a grapple 160 attached to the first end 140 of the boom 100. The illustrated grapple 160 is a claw-like member configured to pick up items to be moved. As is well known to those skilled in this area of technology, the boom 100 can be equipped with any of a wide variety of different grapples or attachments. The boom 100 can move the grapple 160 up and down (e.g., relative to a ground surface 40), forward and rearward (e.g., further from or closer to the cab 30 of the truck 20), and side-to-side. The grapple 160 can comprise any type of grapple or attachment known in the art and will be selected based on the intended use of the loader 10.

The illustrated grapple 160 includes a pair of tines 170 that are pivotally attached together. The tines 170 are configured to pivot toward each other to grasp an item to be moved and are configured to pivot away from each other to release the item after the loader 10 has moved the item to its desired location. In some cases, the grapple 160 has a single pair of tines as shown in FIGS. 1 and 2. In other embodiments, the grapple 160 has three or more tines. The tines 170 can be wider or narrower as needed to suit a particular application. More generally, the grapple 160 can be any desired type of grapple or attachment. It need not have tines 170, much less the type of tines shown. The illustrated grapple 160 can be replaced, for example, with various types of log grapples, combination grapples, clam shell grapples, compaction grapples, orange peel grapples, bucket attachments, glass pane attachments, rake attachments, railroad tie grapples, scrap handling attachments, pulpwood handling attachments, magnet rotators, butt tine grapples, tamping grapples, bale clamp grapples, or various rope or cable attachments.

The loader 10 (e.g., an upper assembly 98 thereof) preferably includes an operator station 200. When provided, the operator station 200 preferably is adjacent to (e.g., and mounted to) a pedestal 210 to which the boom 100 is mounted. As shown in FIGS. 1 and 2, the pedestal 210 can optionally be positioned behind (at least in part), and elevated above, the cab 30 of the truck 20. The pedestal 210 rotates when the boom 100 swings in either direction (i.e., clockwise or counterclockwise). The illustrated pedestal 210 is configured to rotate together (i.e., conjointly) with the boom 100. Moreover, the illustrated boom is part of an upper assembly 98 that also includes an operator station 200. Thus, the boom 100 and the optional operator station 200 preferably are configured to rotate together with the pedestal 210.

The boom 100 will commonly be mounted to the pedestal 210 via two mount brackets (e.g., plates) 211, which can project vertically from the pedestal 210. In such cases, the boom 100 preferably is attached pivotally to the two mount brackets 211. At least one hydraulic cylinder can be attached between the boom 100 and the mount brackets 211, e.g., such that the boom 100 pivots (e.g., in a vertical plane) relative to the mounting plates 211 in response to actuation of such one or more hydraulic cylinders.

In FIGS. 1 and 2, the illustrated operator station 200 includes an operator seat 220. In embodiments of this nature, an operator can sit on the operator seat 220 while controlling the loader 10. The illustrated operator seat 220 is mounted on, and/or relative to, the pedestal 210 such that the operator seat 220 is configured to rotate together with the pedestal 210. For example, as shown in FIGS. 1 and 2, the operator seat 220 can be attached to an operator platform and/or a framework 102 that is attached to the pedestal 210.

In the embodiment illustrated, the operator station 200 includes a cage 212 at least partially surrounding the operator seat 220. Here, the operator station 200 comprises a framework 102 and an operator platform that support the cage 212 and are rigidly attached to the pedestal 210. This is shown in FIGS. 1 and 2. Thus, the framework 102 of the illustrated operator station 200 and the pedestal 210 are rigidly coupled together so as to rotate together as a single unit.

While the illustrated operator station 200 includes a cage 212, this is not required. For example, the operator seat 220 may be attached directly to the pedestal 210 (in which case there may optionally be no surrounding cage) or to an operator platform and/or framework 102 that is attached to the pedestal 210. When provided, the platform of the operator station 200 (which may define a floor of the operator station) preferably is coupled rigidly (directly or indirectly, e.g., via framework 102) to the pedestal 210 such that the platform and the pedestal 210 are configured to rotate together as a single unit.

The loader 10 further includes a control system. The control system can include any conventional loader controls (mechanical control, hydraulic pilot control, or electro-hydraulic control) that allow the operator to control operation of the loader 10. Such controls can include hand and/or foot-operated controls, such as joysticks and pedals (e.g., PCL4 joystick and foot pedal, available commercially from Parker Hannifin Corp., of Elyria, Ohio, U.S.A.). Another example of suitable foot controls is the TWIN 971-SMC48, which is commercially available from LINEMASTER Switch Corporation of Woodstock, Conn., USA. In some cases, a hand-held remote control can be provided instead of, or in addition to, controls positioned on the loader 10. More generally, various well-known hydraulic components useful for the present invention and mentioned herein can be purchased from Parker Hannifin Corp. As is well known to skilled artisans, the control system can optionally be provided adjacent an operator seat 220 such that the operator can operate the control system while seated in such an operator seat 220.

As shown in FIGS. 1 and 2, the pedestal 210 is supported by the base assembly 300, which may be a pedestal base assembly. The base assembly 300 can comprise a frame or other base. In preferred embodiments, the base assembly 300 includes two outrigger (or "stabilizer") legs 310. When provided, the outrigger legs 310 can be (and preferably are) attached to opposite sides of a central support member 320. Whether or not outrigger legs are provided, the central support member 320 can comprise a support column, e.g., a vertical column. Thus, the base assembly 300 can optionally have an A-frame design, which can be used to provide the loader 10 with increased stability. While an A-frame type stabilizer is shown, other conventional types of stabilizers (e.g., out and down stabilizers) can be provided instead of, or in addition to, the illustrated A-frame type stabilizer. In certain embodiments, the loader 10 can include more than two outrigger legs 310 to provide further stability to the loader 10. Furthermore, in some cases, the loader may be devoid of outrigger legs.

In certain embodiments, the central support member 320 (e.g., a support column thereof) is mounted on (or has) a mounting platform. In some embodiments of this nature, the mounting platform is positioned on, and secured to, a truck 20 or trailer. Whether or not the base assembly 300 includes a mounting platform, the central support member 320, in some cases, may be secured directly to a truck 20 or trailer. If desired, the optional mounting platform can comprise one or more metal plates attached rigidly to the central support member 320 and to both of the illustrated outrigger legs 310.

When provided, the central support member 320 can optionally comprise (e.g., be) an upright column. In the embodiment illustrated, this column has a generally hollow construction with at least one access opening 325 formed therein. When provided, the access opening 325 provides access to the interior (e.g., a generally cylindrical interior space in which hydraulic lines may be located). In the embodiments illustrated, the access opening 325 is located on an upper half of the column (e.g., adjacent the slewing ring and/or closer to the slewing ring than to the ground). These details, however, are by no means required. If desired, two access openings can be provided and optionally located on opposite sides of the column.

The illustrated outrigger legs 310 are positionable to engage a ground surface 40 (see FIGS. 1 and 2). When the outrigger legs 310 engage the ground surface 40, they stabilize the loader 10 by providing leverage to the loader 10. In preferred embodiments, the outrigger legs 310 are telescopic such that they can be extended downwardly to engage the ground surface 40, and telescopically retracted to enable transport of the truck 20 or trailer. In addition, the outrigger legs 310 preferably are individually adjustable such that each outrigger leg 310 can extend different lengths relative to the other outrigger leg 310 in order to facilitate stably positioning the outrigger legs 310 on uneven terrain.

In some cases, the pedestal 210, operator seat 220, and base assembly 300 are part of a single assembly. In such cases, the single assembly is structurally integral, e.g., it can be lifted or otherwise moved as a single unit using, for example, a suitable crane or the like.

Preferably, the loader 10 also includes a ladder 500. The ladder 500 can be mounted on a side of the loader 10. In some cases, the ladder 500 is mounted alongside (e.g., so as to extend vertically alongside) one of two outrigger legs 310 on the loader 10. An arrangement of this nature allows the operator to climb up and down the ladder 500 in order to move between an operator station 200 and the ground surface 40.

Although only a single ladder 500 is provided in some embodiments, in other embodiments, the loader 10 includes more than one ladder 500. When two ladders 500 are provided, each can optionally be mounted alongside a respective one of two outrigger legs 310 on the loader 10. By providing the loader 10 with such ladders 500, an operator can enter (i.e., climb up onto) and exit (i.e., climb down from) the loader 10 on either side of the loader 10. When provided, the one or more ladders 500 preferably are coupled rigidly to the loader 10. For example, each such ladder can optionally be attached (such as by bolts or other removable fasteners) to an outrigger leg 310 of the loader 10.

Whether the loader 10 includes a single ladder 500 or more than one ladder 500, it is to be appreciated that the ladder 500 can be provided on the loader 10 in locations other than those shown. In FIGS. 1-6, each of two ladders 500 is mounted to a respective one of two outrigger legs 310. Alternatively, the one or more ladders 500 can be mounted, for example, to the central support member 320.

If desired, the present loader 10 can have an operator elevator of the nature described in U.S. patent application Ser. No. 16/211,638, entitled "Loader With Operator Elevator System," filed Dec. 6, 2018, the contents of which concerning the elevator are hereby incorporated herein.

As discussed above, the loader 10 has a hydraulic system. The hydraulic system includes a hydraulic fluid reservoir 605 (see FIGS. 1 and 2), a hydraulic pump 610, and a plurality of hydraulic fluid lines 620. The hydraulic fluid reservoir 605 is a container that holds hydraulic fluid. As one non-limiting example, the reservoir 605 can be a conventional 30 gallon reservoir with a sight gauge, screen, shut off and stainless steel coil for cold weather heating. Various conventional reservoir types can be used. The hydraulic pump 610 preferably is configured to move hydraulic fluid from the hydraulic fluid reservoir 605 through one or more of the hydraulic fluid lines 620 to the hydraulic motor 105 and/or the boom 100. In certain embodiments, the pump 610 is a conventional load sense piston pump. The hydraulic reservoir 605 and the hydraulic pump 610 are not limited in terms of where they are positioned.

The present loader 10 has a boom swing control assembly 700. The boom swing control assembly 700 comprises a control gear 705. Preferably, the control gear 705 is mounted such that it projects downwardly from the upper assembly 98 and engages the slewing ring 400 (e.g., has gear teeth intermeshed with gear teeth of a slew gear of the slewing ring). In such cases, when the upper assembly 98 (and a boom 100 thereof) rotates relative to the base assembly 300, the control gear 705 (due to its engagement with the slewing ring) rotates and moves along the slewing ring. The control gear 705 will be described in greater detail below. The boom swing control assembly 700 is configured to control a swing of the boom 100 by limiting how far the boom 100 is permitted to swing in one or more directions.

Thus, the loader 10 also includes a slewing ring 400. As is well-known to skilled artisans, a slewing ring (or slewing bearing) is a rotational bearing element that often supports a heavy rotatable load. The slewing ring 400 used in the present invention can be any conventional slewing ring 400 that comprises a slew gear 405. The illustrated slewing ring 400, or at least the slew gear 405 thereof, is configured to remain stationary relative to the upper assembly 98 when the upper assembly 98 rotates. Preferably, the slewing ring 400, or at least the slew gear 405 thereof, is rigidly attached to the base assembly 300 of the loader. This is perhaps best shown in FIGS. 3-6.

Figure 5:
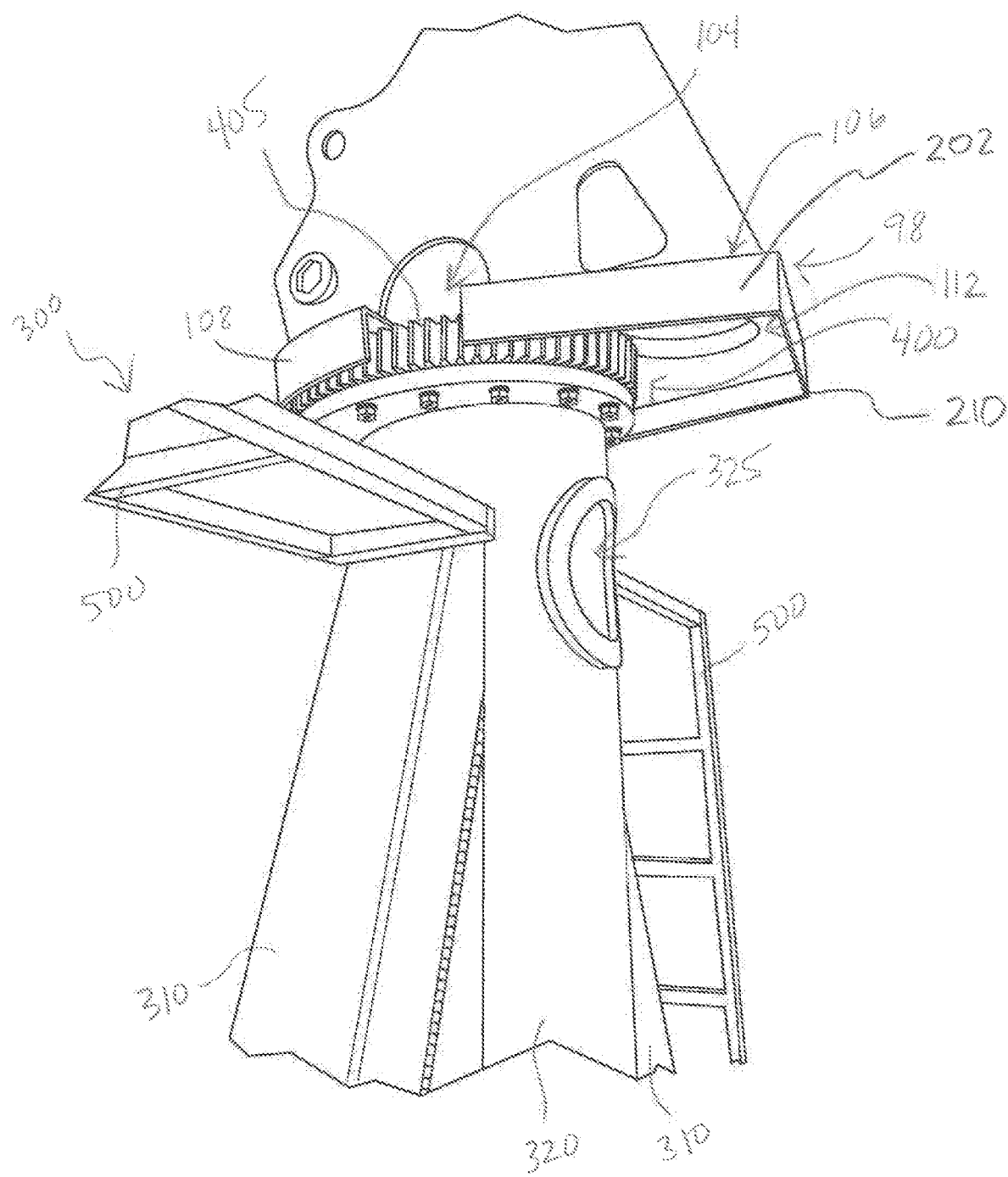
FIG. 5 is a side perspective view of the loader of FIG. 3.
Figure 6:
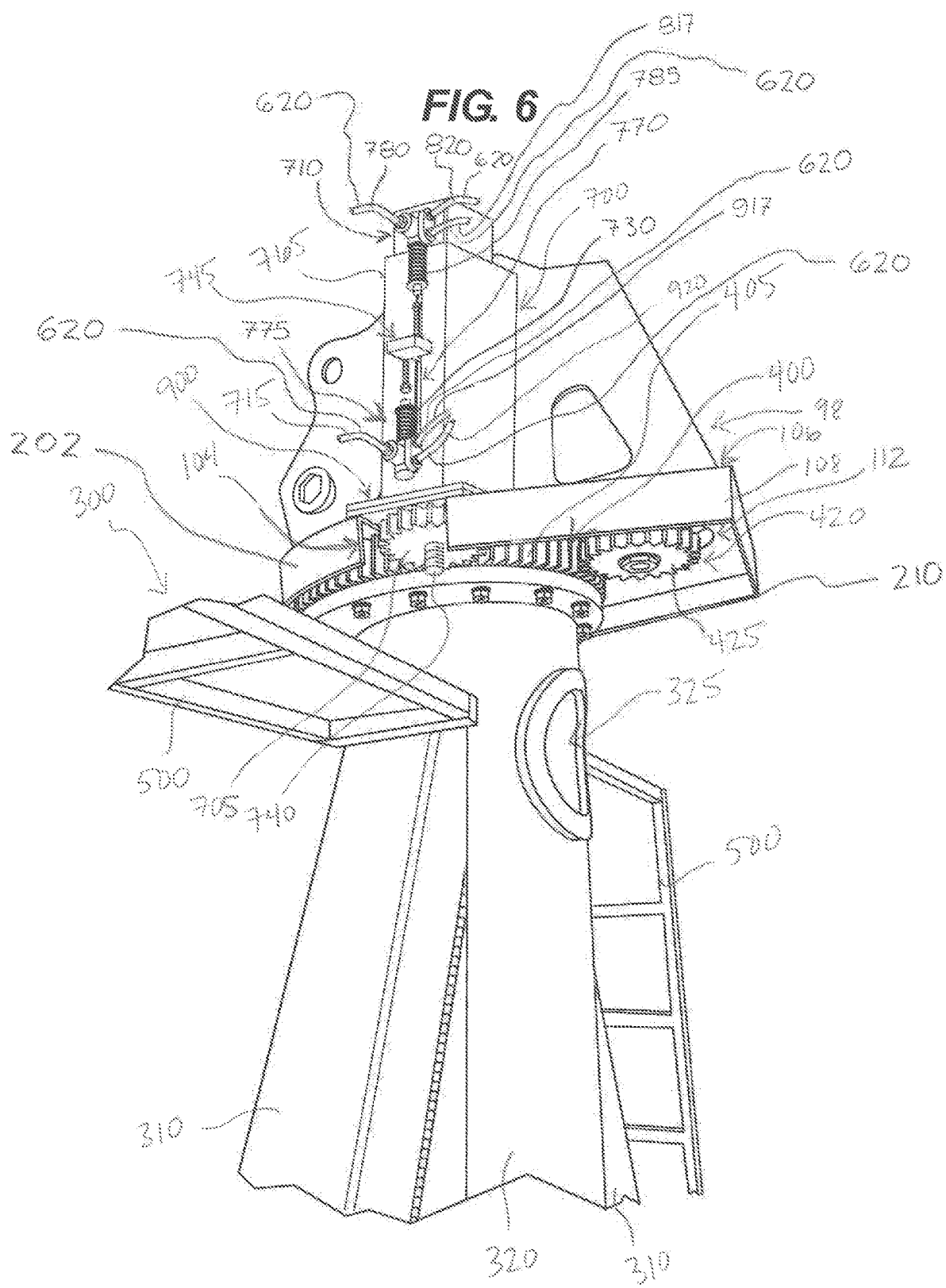
FIG. 6 is a side perspective view of the loader of FIG. 3, showing a swing control assembly having a control gear, and wherein the gear box and hydraulic motor omitted from FIG. 3. are schematically illustrated.

In the illustrated embodiment, the control gear 705 of the boom swing control assembly 700 is engaged with the slew gear 405 of the slewing ring 400. As shown in FIG. 6, the control gear 705 includes gear teeth that are engaged (i.e., intermeshed) with gear teeth of the slew gear 405. The control gear 705 is thus configured to rotate in response to rotation of the boom 100 (e.g., in response to rotation of an upper assembly 98 of the loader). Thus, rotation of the boom 100 (e.g., rotation of upper assembly 98) in one direction will cause the control gear 705 to rotate in a corresponding direction, whereas rotation of the boom (e.g., rotation of upper assembly) in an opposite direction will cause the control gear to rotate in a corresponding direction. During this rotation, the control gear rotates and moves along a circumference of the slewing ring The illustrated pedestal 210 comprises a shroud (e.g., a cover or housing) 202 above and/or surrounding the slew gear 405. In the embodiment illustrated in FIGS. 5 and 6, the shroud 202 has an open region (e.g., a slot, cut-out, or other recess) 104. As shown, the open region 104 can extend continuously from (e.g., can be formed in) a top surface 106 of the shroud 202 through a side wall 108 of the shroud 202. As shown in FIG. 5, the open region 104 exposes a portion of the slew gear 705. In FIG. 6, the illustrated boom swing control assembly 700 is mounted (optionally on the shroud 202) such that the control gear 705 is received in (and/or projects through) the open region 104 so as to engage the slew gear 405. While not required in all embodiments, the illustrated shroud 202 defines a shelf for mounting the boom swing control assembly 700. In other cases, the boom swing control assembly 700 can be otherwise mounted to, or incorporated into, the upper assembly 98 of the loader 10 such that the control gear 705 is operatively positioned to engage the slewing ring 400.

Figure 4:
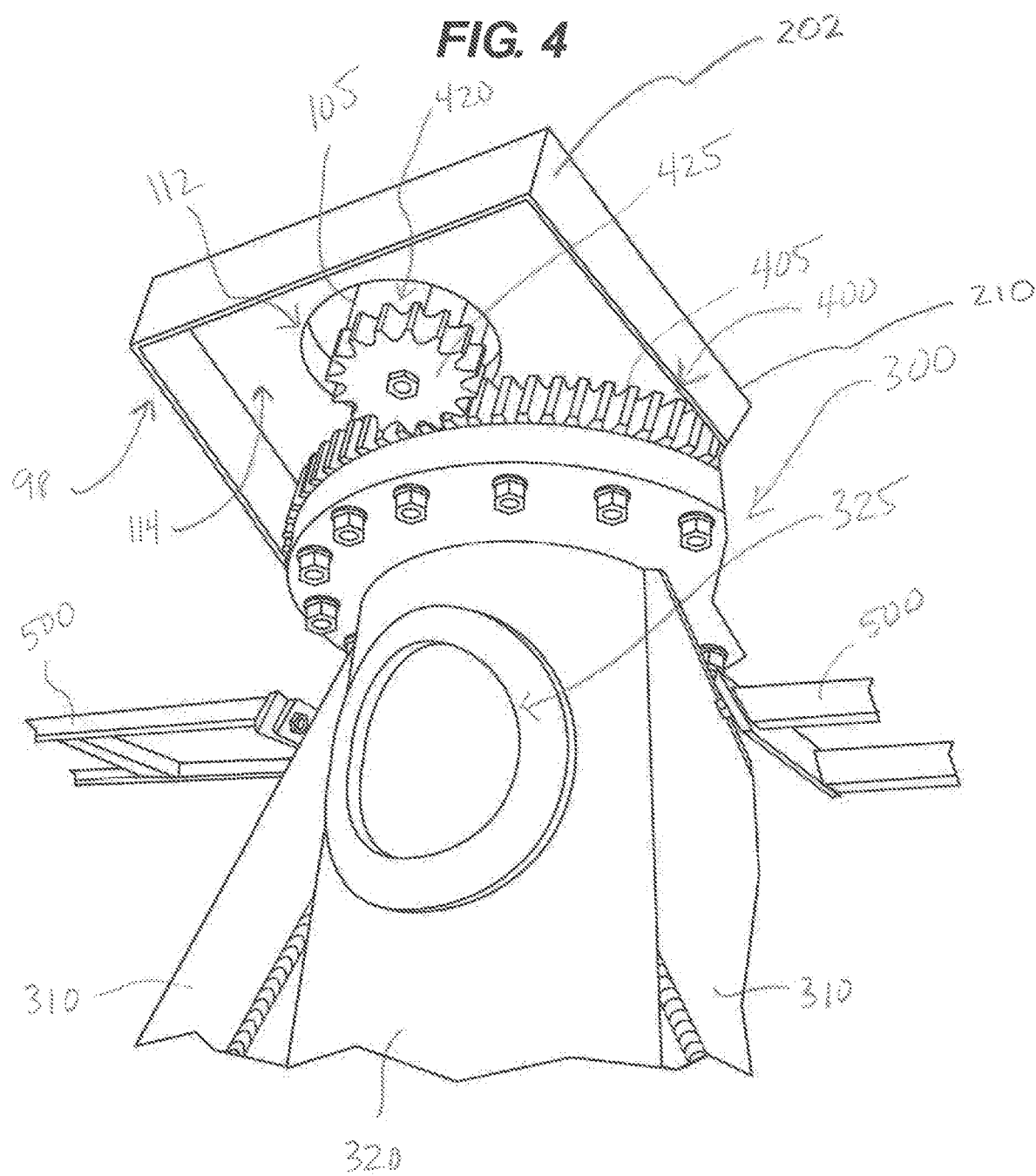
FIG. 4 is a partially broken-away rear perspective view of the loader of FIG. 3, schematically illustrating the gear box and hydraulic motor omitted from FIG. 3.

The loader 10 preferably includes a gear box 420. When provided, the gear box 420 can be any conventional gear box comprising a drive gear 425. The hydraulic motor 105 is operably coupled with the gear box 420 so as to be configured to rotate the drive gear 425. The drive gear 425 is engaged with the slew gear 405 of the slewing ring 400 such that the upper assembly 98 (including the boom 100) rotates relative to the base assembly 300 in response to rotation of the drive gear 425. Preferably, the hydraulic motor 105 is adjacent to the gear box 420 on the upper assembly 98. Reference is made to FIG. 4.

In certain embodiments, the shroud 202 includes an opening 112 (FIGS. 3-6), which can optionally be open to a recessed area in which at least a portion of the gear box and/or the hydraulic motor are received. This is shown schematically in FIG. 4. The recessed area can be bounded by the shroud 202 and/or by a housing mounted thereon. In such cases, the opening 112 can open through a bottom surface 114 of the shroud 202. In some embodiments, as shown in FIG. 4, the hydraulic motor 105 is positioned in the recessed area, and at least a portion of the gear box 420 projects downwardly from the opening 112 and/or the recessed area. This, however, is not required.

The boom swing control assembly 700 includes a first valve 710 and a first hydraulic line 817. The first hydraulic line 817 is in fluid communication with both the first valve 710 and the hydraulic motor 105. The first valve 710 has an open configuration 712 (FIGS. 7 and 8) and a closed configuration 714 (FIGS. 9 and 10). When the first valve 710 is in the open configuration 712, hydraulic fluid is free to pass through the first hydraulic line 817 to the hydraulic motor 105 (provided that operator controls are set to allow such flow of hydraulic fluid). In contrast, when the first valve 710 is in the closed configuration 714, hydraulic fluid is restrained from (e.g., at least limited in, and preferably blocked entirely from) passing through the first hydraulic line 817 to the hydraulic motor 105. In more detail, when the first valve 710 is in the closed configuration 714, hydraulic fluid preferably is prevented from flowing through (e.g., passing through) the first valve to the first hydraulic line 817.

The first valve 710 is configured to move from the open configuration 712 to the closed configuration 714 in response to a desired amount of rotation of the control gear 705 in a first direction. In some cases, the first direction refers to a clockwise direction, whereas in other cases, it refers to a counter-clockwise direction.

When the first valve 710 is in the open configuration 712, the upper assembly 98 (including the boom 100) rotates in a primary direction in response to sufficient hydraulic fluid flowing through the first hydraulic line 817 to the hydraulic motor 105. However, when the first valve 710 is in the closed configuration 714, the upper assembly 98 is restrained against rotation (e.g., prevented from rotating) in the primary direction. Thus, the first valve 710 sets a first stop (or "limit") that restricts how far the upper assembly 98 (including the boom 100) is able to swing in the primary direction. In some cases, the primary direction is a clockwise direction, whereas in other cases, it is a counter-clockwise direction.

In preferred embodiments, the boom swing control assembly 700 is configured such that movement of the upper assembly 98 in the primary direction gradually slows and comes to a stop (as opposed to coming to a sudden, abrupt stop) in response to the first valve 710 moving from the open configuration 712 to the closed configuration 714. In some instances, the first valve 710 has a desired port (i.e., a desired internal flow passageway) that gradually becomes smaller when the first valve 710 moves from the open configuration 712 toward the closed configuration 714. Preferably, the desired port is closed when the first valve is in the closed configuration. This arrangement of the first valve 710 provides the loader 10 with an operational feature that prevents the boom 100 from abruptly stopping, and instead, ensures that the boom 100 stops gradually, slowly, and/or at a controlled rate.

The first valve 710 comprises a first valve member 720 that is moveable between an open position 722 (FIGS. 7 and 8) and a closed position 724 (FIGS. 9 and 10). When the first valve member 720 is in the open position 722, the first valve 710 is in the open configuration 712. Preferably, this involves the first valve member 720 being positioned so as to leave open the desired port of the first valve 710. In contrast, when the first valve member 720 is in the closed position 724, the first valve 710 is in the closed configuration 714. Preferably, this involves the first valve member 720 projecting into (e.g., so as to close) the desired port of the first valve.

The illustrated first valve 710 includes a first valve housing 716. The first hydraulic line 817 preferably is coupled to the first valve housing 716, directly or indirectly. In certain embodiments, the first valve 710 is configured such that a portion of the first valve member 720 moves into (or further into) the desired port of the first valve 710 when the first valve member 720 moves from the open position 722 to the closed position 724.

In FIGS. 7-10, the first valve 710 also comprises a first spring 730. The first spring 730 is operably coupled to the first valve member 720 so as to resiliently bias the first valve member 720 toward the open position 722. In certain embodiments, the first spring 730 is disposed about the first valve member 720. In such cases, a spring collar 728 can optionally be coupled to an end of the first valve member 720 distal to the first valve housing 716. In such cases, the first spring 730 preferably is mounted between the spring collar 728 and the first valve housing 716.

Preferably, the boom swing control assembly 700 also includes a second valve 775 and a second hydraulic line 917. When provided, the second hydraulic line 917 is in fluid communication with both the second valve 775 and the hydraulic motor 105. Like the first valve 710, the second valve 775 has both an open configuration 776 and a closed configuration (not shown). When the second valve 775 is in the open configuration 776, hydraulic fluid is free to pass through the second hydraulic line 917 to the hydraulic motor 105 (provided that operator controls are set to allow such flow of hydraulic fluid). In contrast, when the second valve 775 is in the closed configuration, hydraulic fluid is restrained from (e.g., at least limited in, and preferably blocked entirely from) passing through the second hydraulic line 917 to the hydraulic motor 105. Although the closed configuration of the second valve 775 is not shown, skilled artisans will appreciate that it is similar to the closed configuration 714 of the first valve 710. In more detail, when the second valve 775 is in the closed configuration, hydraulic fluid preferably is prevented from flowing through (e.g., passing through) the second valve to the second hydraulic line 917.

The second valve 775 is configured to move from the open configuration 776 to the closed configuration in response to a desired amount of rotation of the control gear 705 in a second direction. The first and second directions are opposite directions (e.g., clockwise and counter-clockwise). Thus, in embodiments having both the first 710 and second 775 valves, sufficient rotation of the control gear 705 in either the first direction or the second direction will restrain (e.g., reduce and gradually stop) hydraulic fluid flow through at least one port/flow path of the first valve 710 or the second valve 775. The particular valve adjusted (i.e., first valve 710 or second valve 775) will depend on which direction the control gear 705 rotates.

When the second valve 775 is in the open configuration 776, the upper assembly 98 (including the boom 100) rotates in a secondary direction in response to sufficient hydraulic fluid flowing through the second hydraulic line 917 to the hydraulic motor 105. However, when the second valve 775 is in the closed configuration, the boom 100 is restrained against rotation (e.g., prevented from rotating) in the secondary direction. Thus, the second valve 775 sets a second stop that restricts how far the upper assembly 98 (including the boom 100) is able to swing in the secondary direction. The primary and secondary directions are opposite directions. In some cases, the primary direction is a clockwise direction, and the secondary direction is a counter-clockwise direction. However, in other cases, the primary direction is a counter-clockwise direction, and the secondary direction is a clockwise direction.

In preferred embodiments, the boom swing control assembly 700 is configured such that movement of the boom 100 in the secondary direction gradually slows and comes to a stop (as opposed to coming to a sudden, abrupt stop) in response to the second valve 775 moving from the open configuration 776 to the closed configuration. In some cases, the second valve 775 has a desired port (i.e., a desired internal flow passageway) that gradually becomes smaller when the second valve 775 moves from the open configuration 776 toward the closed configuration. Preferably, the desired port is closed when the second valve is in the closed configuration. Similar to the gradual slowing and stopping movement of the first valve 710, this arrangement of the second valve 775 provides the loader 10 with an operational feature that prevents the boom 100 from abruptly stopping, and instead, ensures that the boom 100 stops gradually, slowly, and/or at a controlled rate.

The second valve 775 comprises a second valve member 781 that is moveable between an open position 782 (FIGS. 7-10) and a closed position (not shown). When the second valve member 781 is in the open position 782, the second valve 775 is in the open configuration 776. Preferably, this involves the second valve member 781 being positioned so as to leave open the desired port of the second valve 775. In contrast, when the second valve member 781 is in the closed position, the second valve 775 is in the closed configuration. Thus, the closed position of the illustrated second valve member 781 is like the closed position 724 of the illustrated first valve member 720.

The illustrated second valve 775 includes a second valve housing 777. The second hydraulic line 917 preferably is coupled to the second valve housing 777, directly or indirectly. In certain embodiments, the second valve 775 is configured such that a portion of the second valve member 781 moves into (or further into) the desired port of the second valve 775 when the second valve member 781 moves from the open position 782 to the closed position.

In FIGS. 7-10, the second valve 775 comprises a second spring 785. The second spring 785 is operably coupled to the second valve member 781 so as to resiliently bias the second valve member 781 toward the open position 782. In certain embodiments, the second spring 785 is disposed about the second valve member 781. In such cases, a spring collar 787 can optionally be coupled to an end of the second valve member 781 distal to the second valve housing 777. In such cases, the second spring 785 preferably is mounted between the spring collar 787 and the second valve housing 777.

The first and second valves 710, 775 preferably are hydraulic selector valves, e.g., three-way hydraulic selector valves. Valves of this nature are available from a variety of well-known commercial suppliers, such as Parker Hannifin Corp. In one non-limiting example, the first and second valves 710, 775 are Gresen Parker three-way selector valves, e.g., model Sm-50. Thus, in some cases, the first and second valves 710, 775 may be constructed for (and may be operated so as to have) a maximum pressure of 2,000 psi, a maximum flow of 20 gallons per minute, or both. It is to be appreciated, however, that these details are by no means limiting, as various other valve constructions can be used to accommodate different applications.

In the embodiment illustrated, hydraulic line 715 is configured to deliver hydraulic fluid to (e.g., into) the first valve 710, hydraulic line 780 is configured to deliver hydraulic fluid to (e.g., into) the second valve 775, and hydraulic lines 820, 920 are tied together. Since the hydraulic fluid must go somewhere when one of the valves 710, 775 closes, the illustrated hydraulic lines 820, 920 are tied together so hydraulic fluid can go to the open side of the other valve. Given the present teaching as a guide, skilled artisans will appreciate that various alternative hydraulic line arrangements can be provided.

Preferably, the boom swing control assembly 700 further comprises a threaded shaft 740. In such cases, the control gear 705 may be operably coupled to the threaded shaft 740 such that the control gear 705 and the threaded shaft 740 are configured to rotate together (i.e., conjointly). In FIGS. 6-10, the first valve 710 is configured to move from the open configuration 712 to the closed configuration 714 in response to sufficient rotation of the threaded shaft 740 in a desired direction. Similarly, the illustrated second valve 775 is configured to move from the open configuration 776 to the closed configuration in response to sufficient rotation of the threaded shaft 740 in an opposite direction (i.e., opposite to the direction that moves the first valve 710 from the open 712 to the closed 714 configuration). As shown in FIGS. 6-10, the control gear 705 preferably is coupled to the threaded shaft 740 adjacent a first end 742 of the threaded shaft 740. This, however, is not required.

With reference to FIG. 9, it can be appreciated that, in certain embodiments, a second end of the threaded shaft 740 is mounted in a bearing assembly 726. The bearing assembly 726 can be mounted to a housing 765 of the boom swing control assembly. The threaded shaft 740 can thus be mounted for rotation about its longitudinal axis (e.g., rotation relative to housing 765).

The illustrated boom swing control assembly 700 further comprises an arm 745 operably coupled to the threaded shaft 740 such that the arm 745 moves along the longitudinal axis of the threaded shaft 740 in response to rotation of the threaded shaft 740. In preferred embodiments of this nature, the arm 745 has an internally threaded opening 741 that receives the threaded shaft 740 such that threads on the threaded shaft 740 engage the internally threaded opening 741 on the arm 745, thereby configuring the arm 745 to move along the threaded shaft 740 in response to rotation of the threaded shaft 740.

With continued reference to the embodiments of FIGS. 6-10, the arm 745 has a first side 750 that is adjacent the first valve 710. The first valve 710 moves from the open configuration 712 toward the closed configuration 714 in response to the first side 750 of the arm 745 bearing against the first valve 710 (so as to overcome the bias of the first spring 730). Once the arm moves the first valve 710 to the closed configuration, hydraulic fluid preferably is prevented from flowing from the first valve to the hydraulic motor 105. In contrast, when the first side 750 of the illustrated arm 745 is spaced apart from the first valve 710, the first valve 710 is in the open configuration 712 (such that hydraulic fluid is allowed to pass from the first valve 710 to the hydraulic motor 105).

In certain embodiments, the first side 750 of the arm 745 has a first projection 751. In such cases, the first projection 751 has an end 753 that is adjacent the first valve 710. In embodiments of this nature, the first valve 710 moves from the open configuration 712 toward the closed configuration 714 in response to the first projection 751 bearing against the first valve 710. In contrast, when the first projection 751 is spaced apart from the first valve 710, the first valve 710 is in the open configuration 712 (e.g., is retained in the open configuration by the first spring 730). In some cases, the first projection 751 is a bolt 759 that is externally threaded and received in an internally threaded bore of the arm 745. This arrangement allows an extent to which the bolt 759 projects toward the first valve 710 to be adjusted by rotating the bolt 759 relative to the arm 745, thereby allowing the swing limit set by the first valve 710 to be adjustable.

It is to be appreciated that various types of projections other than the noted bolt projection can be provided. Another alternative is to provide an adjustable length projection on the first valve, and to eliminate the noted bolt 759 or other projection 751 of the arm 745.

The illustrated arm 745 has a second side 752 that is adjacent the second valve 775. The second valve 775 moves from the open configuration 776 toward the closed configuration in response to the second side 752 of the arm 745 bearing against the second valve 775 (so as to overcome the bias of the second spring 785). Once the arm moves the second valve 775 to the closed configuration, hydraulic fluid preferably is prevented from flowing from the second valve to the hydraulic motor 65. In contrast, when the second side 752 of the arm 745 is spaced apart from the second valve 775, the second valve 775 is in the open configuration 776 (such that hydraulic fluid is allowed to pass from the second valve to the hydraulic motor).

In certain embodiments, the second side 752 of the arm 745 has a second projection 755. When provided, the second projection 755 preferably has an end 756 that is adjacent the second valve 775. In embodiments of this nature, the second valve 775 moves from the open configuration 776 toward the closed configuration in response to the second projection 755 bearing against the second valve 775. In contrast, when the second projection 755 is spaced apart from the second valve 775, the second valve 775 is in the open configuration 776 (e.g., is retained in the open configuration by the second spring 785). In some cases, the second projection 755 is a bolt 760 that is externally threaded and received in an internally threaded bore of the arm 745. This arrangement allows an extent to which the bolt 760 projects toward the second valve 775 to be adjusted by rotating the bolt 760 relative to the arm 745, thereby allowing the swing limit set by the second valve 775 to be adjustable.

Instead of using a bolt for the second projection, various other adjustable-length projections can be used. Another option is to provide an adjustable-length projection on the second valve, and to eliminate the noted bolt 760 or other projection 755 of the arm.

Thus, the arm 745 can optionally have two projections 751, 755 projecting in opposite directions, e.g., respectively toward the first 710 and second 775 valves. The valves 710, 775 can be configured such that sufficient movement of the arm 745 in one direction causes the first projection 751 to move the first valve 710 to its closed configuration, whereas sufficient movement of the arm 745 in an opposite direction causes the second projection 755 to move the second valve 775 to its closed configuration.

Figure 7:
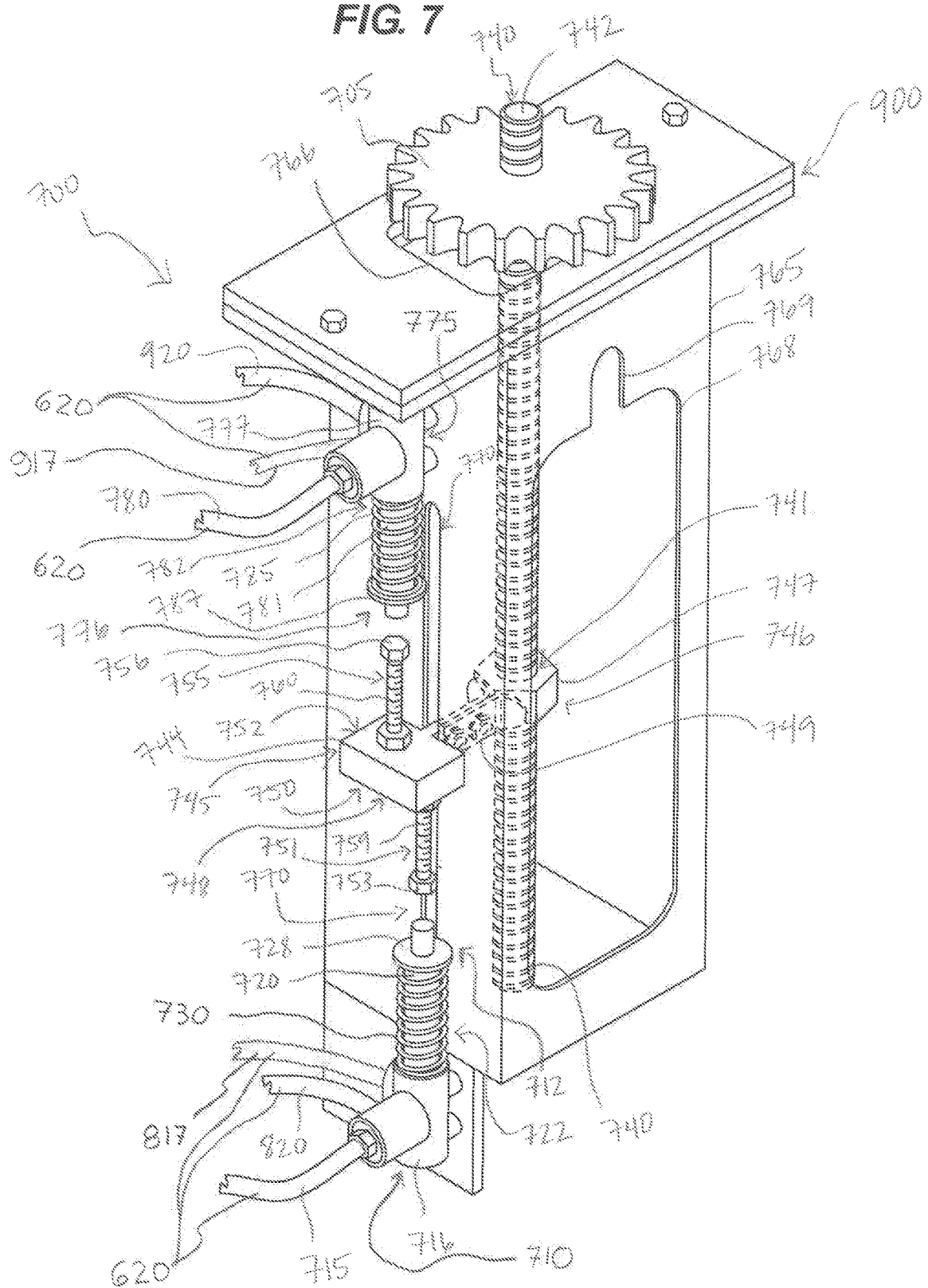
FIG. 7 is a front perspective view of a boom swing control assembly in accordance with certain embodiments of the present disclosure.
Figure 8:
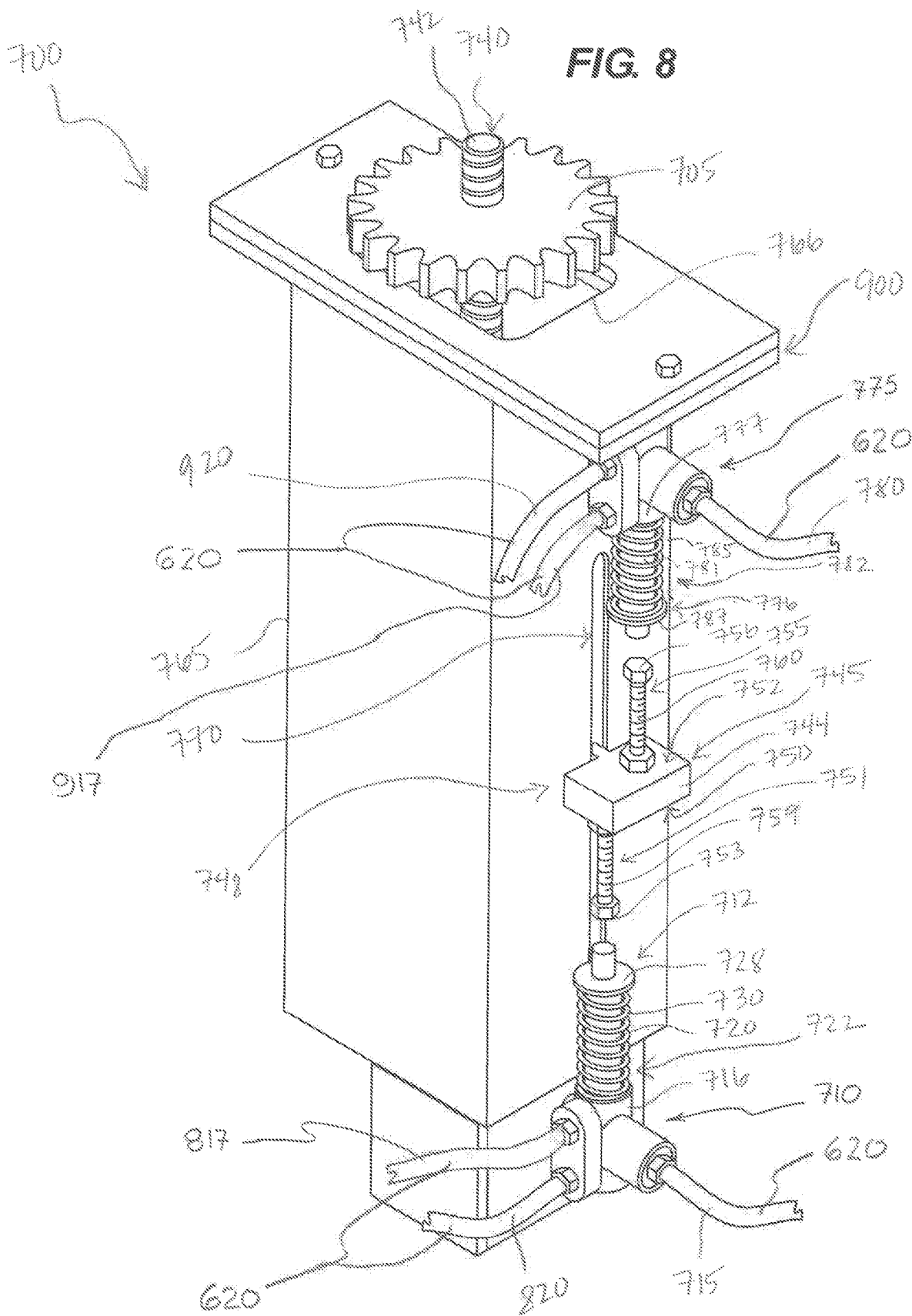
FIG. 8 is a rear perspective view of the boom swing control assembly of FIG. 7.

In some cases, the arm 745 includes a block 744, a fastener 747, and a medial portion (e.g., a neck) 749 extending between the block 744 and the fastener 747. As shown in FIGS. 7 and 9, the fastener 747 can be a nut or another internally threaded member coupled to (and threadably slidable) along the arm 745.

When the first projection 751 is provided, it can be coupled to and extend outwardly from the block 744 on the first side 750 of the arm 745. When the arm 745 does not include the first projection 751, the block 744 can be sized, shaped, and oriented such that the block 744 itself bears directly against the first valve 710 (e.g., an adjustable-length projection thereof). Similarly, when the second projection 755 is provided, the second projection 755 can be coupled to and extend outwardly from the block 744 on the second side 752 of the arm 745. When the arm 745 does not include the second projection 755, the block 744 can be sized shaped, shaped, and oriented such that the block 744 itself bears directly against the second valve 775 (e.g., an adjustable-length projection thereof).

As best shown in FIGS. 9 and 10, the first valve 710 (and the first projection 751, when provided) can optionally be offset from the second valve 775 (and the second projection 755) laterally, i.e., relative to an axis that is parallel to the longitudinal axis of the threaded shaft 740. This, however, is not required. For example, in other embodiments, the first valve 710 (and the first projection 751, when provided) is directly aligned with the second valve 775 (and the second projection 755).

In preferred embodiments, the boom swing control assembly 700 comprises a housing 765. One non-limiting housing 765 is shown in FIGS. 6-9. Here, the illustrated housing 765 has a cuboidal or at least generally cuboidal shape. However, the housing can be provided in various different shapes. In the embodiment illustrated, the first valve 710 and the second valve 775 are located outside the housing 765. In addition, it is preferred that the threaded shaft 740 is positioned (e.g., mounted) in the housing 765 such that at least a major length (i.e., more than 50%) of the threaded shaft 740 is located inside the housing 765. These details, however, are not required.

In FIGS. 6-9, the control gear 705 is located outside the housing 765. In such embodiments, the housing 765 includes at least a first opening 766 through which the threaded shaft 740 extends. Thus, the illustrated control gear 705 is coupled to the threaded shaft 740 at a location outside the housing. The first opening 766 can be formed in an end wall of the housing 765.

In certain embodiments, one or more mounting plates 900 are coupled to the housing 765. When provided, the one or more mounting plates 900 can optionally be used to mount the housing 765 to the shroud 202 of the upper assembly 98. One non-limiting manner of mounting the housing 765 is shown in FIG. 6. Here, the portion of the threaded shaft 740 carrying the control gear 705 extends out of the housing 765 and through the mounting plate(s) 900. In cases where there are multiple (e.g., two) mounting plates 900, the mounting plates 900 can be fastened together. The mounting plate(s) 900 can be mounted on the shroud 202 of the upper assembly 98 to support the boom swing control assembly 700 thereon. As noted above, the boom swing control assembly 700 is positioned such that the control gear 705 engages the slew gear 405.

In certain embodiments, the housing 765 has a side opening 768 (FIGS. 7 and 9). In some cases, the side opening 768 includes a notch 769. The illustrated notch 769 is aligned with the longitudinal axis of the threaded shaft 740. These details, however, are by no means limiting to the invention.

As noted above, the illustrated arm 745 has opposed first 746 and second 748 ends. Preferably, the first end 746 of the arm 745 is mounted on the threaded shaft 740 at a location inside the housing 765, whereas the second end 748 of the arm 745 is located outside the housing 765. To achieve this configuration, the illustrated housing 765 includes an elongated slot 770 through which the arm 745 extends. In more detail, the first end 746 of the illustrated arm 745 is mounted on the threaded shaft 740 such that the arm 745 moves within and along the elongated slot 770 in response to rotation of the threaded shaft 740.

In certain methods of the present invention, a loader 10 is operated. In these methods, the loader 10 used for the method has a boom swing control assembly 700 in accordance with any embodiment of the present disclosure. Preferably, an operator actuates movement of the boom 100 of the loader 10. This actuation can optionally involve the operator stepping on a pedal and/or using a joystick to swing the boom 100 in a desired direction. As noted above, however, actuation can be accomplished in other ways. In response, the boom 100 swings in the desired direction and comes to a stop (preferably a gradual stop) as the boom 100 approaches the swing stop limit set by the first 710 and/or second 775 valve.

In certain embodiments, the method involves operating the hydraulic motor 105 so as to rotate the drive gear 425, which is engaged with the slew gear 425. Rotation of the drive gear 425 causes the upper assembly 98 (including the boom 100) to rotate. In response, the control gear 705, which is engaged with the slew gear 405, rotates in either a first direction or a second direction. Sufficient rotation of the control gear 405 in the first direction causes the first valve 710 to move to the closed configuration, thereby restraining hydraulic fluid from passing through the first hydraulic line 817 to the hydraulic motor 105, which in turn stops the boom 100 from rotating further in a primary direction. Sufficient rotation of the control gear 405 in the second direction causes the second valve 775 to close, thereby restraining hydraulic fluid from passing through the second hydraulic line 917 to the hydraulic motor 105, which in turn stops the boom 100 from rotating further in a secondary direction.

In some embodiments, rotation of the control gear 105 causes a threaded shaft 740 to rotate, thereby causing an arm 745 to move in one direction or another (depending on the direction of rotation of the control gear 705). Sufficient movement of the arm 745 in one direction causes the first valve 710 to close, whereas sufficient movement of the arm 745 in the opposite direction causes the second valve 775 to close.

Thus, some embodiments of the invention provide a method of operating a loader 10. In some cases, the method begins with an operator climbing up a ladder 500 or riding up an operator elevator, stepping onto an operator station 200, and thereafter sitting in an operator seat 220. The method will typically include the operator operating a control system of the loader 10 so as to cause the loader to move one or more items of material. After such item(s) are moved, the method preferably includes the operator climbing down the ladder 500, or riding down on an operator elevator, to return to the ground surface 40.

While some preferred embodiments of the invention have been described, it should be understood that various changes, adaptations and modifications may be made therein without departing from the spirit of the invention and the scope of the appended claims.

What is claimed is:

1. A loader having an upper assembly, a base assembly, a slewing ring, a hydraulic motor, and a boom swing control assembly, the upper assembly comprising a boom and being mounted on the base assembly so as to rotate relative to the base assembly in response to operation of the hydraulic motor, the slewing ring comprising a slew gear, the boom swing control assembly comprising a control gear engaged with the slew gear such that the control gear rotates in response to rotation of the upper assembly, the boom swing control assembly further comprising a first valve and a first hydraulic line, the first hydraulic line being in fluid communication with both the first valve and the hydraulic motor, the first valve having an open configuration and a closed configuration, such that when the first valve is in the open configuration hydraulic fluid is free to pass through the first hydraulic line to the hydraulic motor, and when the first valve is in the closed configuration hydraulic fluid is restrained from passing through the first hydraulic line to the hydraulic motor, the first valve being configured to move from the open configuration to the closed configuration in response to a desired amount of rotation of the control gear in a first direction, wherein the first valve comprises a first valve member that is moveable between an open position and a closed position, such that when the first valve member is in the open position the first valve is in the open configuration, and when the first valve member is in the closed position the first valve is in the closed configuration, and the first valve further comprises a first spring operably coupled to the first valve member so as to resiliently bias the first valve member toward the open position.

2. The loader of claim 1 wherein, when the first valve is in the open configuration, the upper assembly rotates in a primary direction in response to hydraulic fluid flowing through the first hydraulic line to the hydraulic motor, and when the first valve is in the closed configuration, the upper assembly is restrained against rotation in the primary direction.

3. The loader of claim 2 wherein the boom swing control assembly is configured such that movement of the upper assembly in the primary direction gradually slows and comes to a stop in response to the first valve moving from the open configuration to the closed configuration.

4. The loader of claim 1 wherein the first valve has an internal flow passageway that gradually becomes smaller when the first valve moves from the open configuration toward the closed configuration.

5. The loader of claim 1 wherein the first spring is operably coupled to the first valve member by virtue of the first spring being disposed about the first valve member.

6. The loader of claim 1 wherein the boom swing control assembly further comprises a second valve and a second hydraulic line, the second hydraulic line being in fluid communication with both the second valve and the hydraulic motor, the second valve having an open configuration and a closed configuration, such that when the second valve is in the open configuration hydraulic fluid is free to pass through the second hydraulic line to the hydraulic motor, and when the second valve is in the closed configuration hydraulic fluid is restrained from passing through the second hydraulic line to the hydraulic motor, the second valve being configured to move from the open configuration to the closed configuration in response to a desired amount of rotation of the control gear in a second direction, the first and second directions being opposite directions.

7. The loader of claim 6 wherein, when the second valve is in the open configuration, the boom rotates in a secondary direction in response to sufficient hydraulic fluid flowing through the second hydraulic line to the hydraulic motor, and when the second valve is in the closed configuration, the boom is restrained against rotation in the secondary direction.

8. The loader of claim 7 wherein the boom swing control assembly is configured such that movement of the boom in the secondary direction gradually slows and comes to a stop in response to the second valve moving from the open configuration to the closed configuration.

9. The loader of claim 8 wherein the second valve has an internal flow passageway that gradually becomes smaller when the second valve moves from the open configuration toward the closed configuration.

10. The loader of claim 6 wherein the second valve comprises a second valve member that is moveable between an open position and a closed position, such that when the second valve member is in the open position the second valve is in the open configuration, and when the second valve member is in the closed position the second valve is in the closed configuration, the second valve further comprising a second spring operably coupled to the second valve member so as to resiliently bias the second valve member toward the open position.

11. The loader of claim 10 wherein the second spring is operably coupled to the second valve member by virtue of the second spring being disposed about the second valve member.

12. The loader of claim 6 wherein the boom swing control assembly comprises a threaded shaft, the control gear being operably coupled to the threaded shaft such that the control gear and the threaded shaft rotate together, the boom swing control assembly further comprising a housing, the threaded shaft being positioned such that at least a major length of the threaded shaft is located inside the housing, the second valve being located outside the housing, the second valve being configured to move from the open configuration to the closed configuration in response to sufficient rotation of the threaded shaft in a selected direction, said second direction and said selected direction being the same direction.

13. The loader of claim 12 wherein the boom swing control assembly further comprises an arm operably coupled to the threaded shaft such that the arm moves along a longitudinal axis of the threaded shaft in response to rotation of the threaded shaft, the arm having a second side that is adjacent the second valve, the arm is movable between a position where its second side is spaced apart from the second valve and another position where its second side bears against the second valve, such that the second valve moves from the open configuration toward the closed configuration in response to the second side of the arm bearing against the second valve.

14. The loader of claim 13 wherein, when the second side of the arm is spaced apart from the second valve, the second valve is in the open configuration.

15. The loader of claim 1 further including a gear box comprising a drive gear, the hydraulic motor operably coupled with the gear box, the drive gear of the gear box engaged with the slew gear of the slewing ring such that the upper assembly rotates relative to the base assembly in response to rotation of the drive gear.

16. A loader having an upper assembly, a base assembly, a slewing ring, a hydraulic motor, and a boom swing control assembly, the upper assembly comprising a boom and being mounted on the base assembly so as to rotate relative to the base assembly in response to operation of the hydraulic motor, the slewing ring comprising a slew gear, the boom swing control assembly comprising a control gear engaged with the slew gear such that the control gear rotates in response to rotation of the upper assembly, the boom swing control assembly further comprising a first valve and a first hydraulic line, the first hydraulic line being in fluid communication with both the first valve and the hydraulic motor, the first valve having an open configuration and a closed configuration, such that when the first valve is in the open configuration hydraulic fluid is free to pass through the first hydraulic line to the hydraulic motor, and when the first valve is in the closed configuration hydraulic fluid is restrained from passing through the first hydraulic line to the hydraulic motor, the first valve being configured to move from the open configuration to the closed configuration in response to a desired amount of rotation of the control gear in a first direction, wherein the boom swing control assembly comprises a threaded shaft, the control gear being operably coupled to the threaded shaft such that the control gear and the threaded shaft rotate together, such that the first valve is configured to move from the open configuration to the closed configuration in response to sufficient rotation of the threaded shaft in a desired direction, said first direction and said desired direction being the same direction.

17. The loader of claim 16 wherein the boom swing control assembly further comprises an arm operably coupled to the threaded shaft such that the arm moves along a longitudinal axis of the threaded shaft in response to rotation of the threaded shaft.

18. The loader of claim 17 wherein the arm has a first side that is adjacent the first valve, the arm is movable between a position where its first side is spaced apart from the first valve and another position where its first side bears against the first valve, and the first valve moves from the open configuration toward the closed configuration in response to the first side of the arm bearing against the first valve.

19. The loader of claim 18 wherein, when the first side of the arm is spaced apart from the first valve, the first valve is in the open configuration.

20. The loader of claim 18 wherein the first side of the arm includes a first projection having an end that is adjacent the first valve, and the first valve moves from the open configuration toward the closed configuration in response to the first projection bearing against the first valve.

21. The loader of claim 20 wherein, when the first projection is spaced apart from the first valve, the first valve is in the open configuration.

22. The loader of claim 20 wherein the first projection of the arm is a bolt that is externally threaded and received in an internally threaded bore of the arm, such that an extent to which the bolt projects toward the first valve can be adjusted by rotating the bolt relative to the arm.

23. The loader of claim 17 wherein the boom swing control assembly further comprises a housing, the threaded shaft being positioned such that at least a major length of the threaded shaft is located inside the housing, the arm having opposed first and second ends, the first end of the arm being mounted on the threaded shaft and located inside the housing, the second end of the arm being located outside the housing.

24. The loader of claim 23 wherein the housing has an elongated slot through which the arm extends.

25. The loader of claim 24 wherein the first end of the arm is mounted on the threaded shaft such that the arm moves along the elongated slot in response to rotation of the threaded shaft.

26. The loader of claim 16 wherein the boom swing control assembly further comprises a housing, the threaded shaft being positioned such that at least a major length of the threaded shaft is located inside the housing.

27. The loader of claim 26 wherein the control gear is located outside the housing.

28. The loader of claim 26 wherein the first valve is located outside the housing.

29. A loader having a boom, a slewing ring, a gear box, a hydraulic motor, and a boom swing control assembly, the hydraulic motor operably coupled with the gear box, the gear box comprising a drive gear, the slewing ring comprising a slew gear, the drive gear of the gear box engaged with the slew gear of the slewing ring such that the boom rotates in response to rotation of the drive gear, the boom swing control assembly comprising a control gear engaged with the slew gear such that the control gear rotates in response to rotation of the boom, the boom swing control assembly further comprising a first valve and a first hydraulic line, the first hydraulic line being in fluid communication with both the first valve and the hydraulic motor, the first valve having an open configuration and a closed configuration, such that when the first valve is in the open configuration hydraulic fluid is free to pass through the first hydraulic line to the hydraulic motor, and when the first valve is in the closed configuration hydraulic fluid is restrained from passing through the first hydraulic line to the hydraulic motor, the first valve being configured to move from the open configuration to the closed configuration in response to a desired amount of rotation of the control gear in a first direction.

30. The loader of claim 29 wherein the boom swing control assembly comprises a threaded shaft, the control gear being operably coupled to the threaded shaft such that the control gear and the threaded shaft rotate together.

31. The loader of claim 30 wherein the boom swing control assembly further comprises an arm operably coupled to the threaded shaft such that the arm moves along a longitudinal axis of the threaded shaft in response to rotation of the threaded shaft.

32. The loader of claim 31 wherein the arm has a first side that is adjacent the first valve, the arm is movable between a position where its first side is spaced apart from the first valve and another position where its first side bears against the first valve, and the first valve moves from the open configuration toward the closed configuration in response to the first side of the arm bearing against the first valve.

33. The loader of claim 32 wherein the boom swing control assembly further comprises a second valve and a second hydraulic line, the second hydraulic line being in fluid communication with both the second valve and the hydraulic motor, the second valve having an open configuration and a closed configuration, such that when the second valve is in the open configuration hydraulic fluid is free to pass through the second hydraulic line to the hydraulic motor, and when the second valve is in the closed configuration hydraulic fluid is restrained from passing through the second hydraulic line to the hydraulic motor, the second valve configured to move from the open configuration to the closed configuration in response to a desired amount of rotation of the control gear in a second direction, the first and second directions being opposite directions.

34. The loader of claim 29 wherein the loader comprises an upper assembly and a base assembly, the upper assembly comprising the boom and being mounted on the base assembly so as to rotate relative to the base assembly in response to operation of the hydraulic motor, the upper assembly further comprising an operator station, the operator station including an operator seat.

* * * * *